H. W. LODER.
CHAIN TIRE GRIP AND TIGHTENER THEREFOR.
APPLICATION FILED NOV. 27, 1917.

1,416,300.

Patented May 16, 1922.

INVENTOR
Howard W Loder
BY
Harry L Duncan ATTORNEY

UNITED STATES PATENT OFFICE.

HOWARD W. LODER, OF TOWACO, NEW JERSEY, ASSIGNOR TO AMERICAN CHAIN COMPANY, INCORPORATED, OF BRIDGEPORT, CONNECTICUT, A CORPORATION OF NEW YORK.

CHAIN TIRE GRIP AND TIGHTENER THEREFOR.

1,416,300.

Specification of Letters Patent. Patented May 16, 1922.

Application filed November 27, 1917. Serial No. 204,177.

*To all whom it may concern:*

Be it known that I, HOWARD W. LODER, a resident of Towaco, county of Morris, State of New Jersey, have made a certain new and useful Invention Relating to Chain Tire Grips and Tighteners Therefor, of which the following is a specification, taken in connection with the accompanying drawing, which forms part of the same.

This invention relates especially to tightener or take-up devices adapted for use in connection with chain or other tire grips of the Weed-Parsons type, for instance, and in which a flexible tightener member of chain or the like, preferably having means to adjust its effective length, is loosely connected with a spring or other hook or securing member which may be releasably connected with one of the side chains of the tire grip. Other hooks or securing members may be arranged on the ends of the tightener chain to be secured to the side chain of the grip or to be looped through the same and adjustably connected to the tightener chain so as to draw inward on the side chain of the grip at three or more separated points and sufficiently tighten or take up the slack therein to prevent undesirable looseness or rattling under running conditions.

Figure 1:
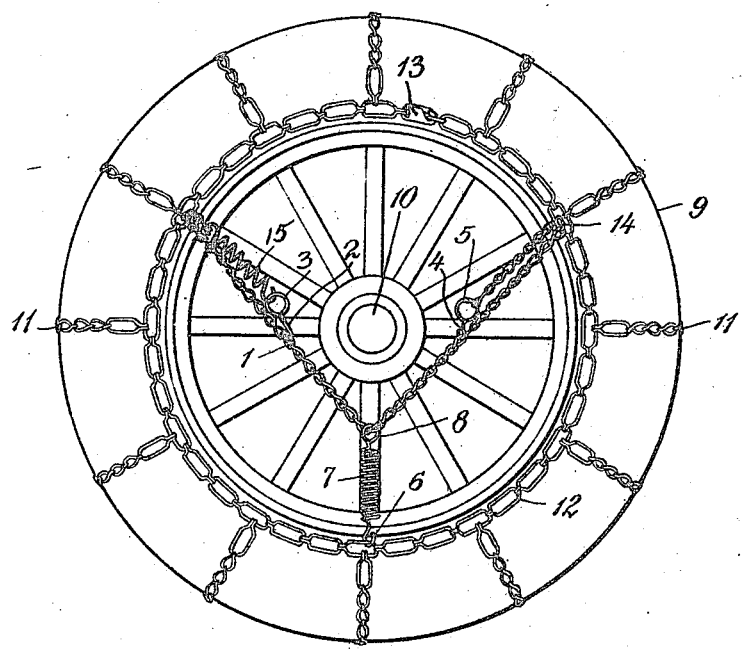
Figure 2:
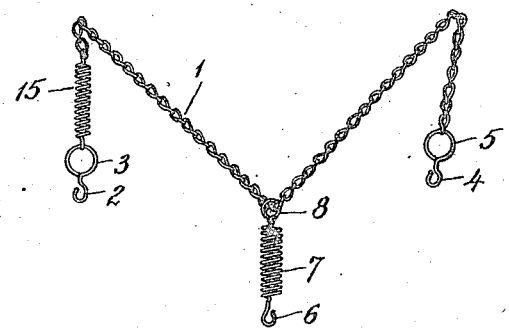

In the accompanying drawing showing in a somewhat diagrammatic way illustrative embodiments of the invention, Fig. 1 shows a chain tire grip with the tightener device applied thereto; and Figure 2 shows the tightener detached from the wheel.

The tightener device may comprise any suitable flexible tightener, such for instance, as a light chain 1 to which any desired hooks or other securing members may be connected adjacent each of its ends. For example, the hook 2 may be connected as by the ring 3 to one end of this tightener chain or to the interposed spiral tightening spring 15 which is desirable in some cases, and the hook 4 may be similarly connected to the other end of the chain by the ring 5. Another intermediate hook or securing member of any suitable construction, such as 6, is preferably releasably or movably connected to the intermediate part of the tightener chain, as for instance, by being connected to the eye 8 which is preferably though not necessarily of smaller diameter than the rings 3, 5, so as to prevent the parts being accidentally disconnected. If desired, a spiral or other tightener spring 7 may be interposed between the hook 6 and eye 8 and in some cases these three parts may be conveniently formed of one piece of spring metal which is a cheap and strong construction.

The tightener may be applied to these Parsons-Weed type chain grips or to other tire grips having chain or other flexible side members by fastening the hooks or securing members of the tightener to the side chain or member at separated points and taking up or adjusting the length of the tightener chain to the extent desired, so that sufficient inward pull is thereby exerted on the side chain at three or more separated points to take up the slack and hold it against undesirable looseness under running conditions. As indicated in Figure 1, one end of the tightener may be rove through a link of the side chain and the hook 2 may engage the tightener itself. The intermediate hook 6 may be secured to the side chain at a point, for example, about 120 degrees from the first hook, then the end of the tightener chain may be passed around or looped through one of the links of the side chain and brought back upon itself so as to take up the slack in this tightener chain and form a loop 14 therein, the hook 4 being hooked into the tightener chain at the desired point. In this way the tightener chain is held out of undesirable contact with the hub 10 and draws the side chain inward with substantially uniform tension at three more or less equally separated points so as to hold the cross chains 11 against the tire 9 in the desired way. In some cases the two ends of the tightener may engage the side chain 12 adjacent and on opposite sides of the detachable connection or connector hook 13 and in that event it is in some cases possible to take off the chain grip without disconnecting the tightener therefrom, although this is not usually desirable.

This invention has been described in connection with a number of illustrative embodiments, forms, proportions, parts, materials, arrangements, and methods of manufacture and use, to the details of which disclosure the invention is not of course to be limited, since what is claimed as new and what is desired to be secured by Letters Patent is set forth in the appended claims:

1. The vehicle wheel having a tire and a chain tire grip thereon and a cooperating tightener connected to a side chain of said grip and comprising a tightener chain, a securing member and a connected attaching device engaging the intermediate portion of said tightener chain, a securing member secured to said tightener chain, a spiral tightening spring connected to said tightener chain and means to prevent the tightener chain being disengaged from said attaching member.

2. The tightener device adapted for use in chain tire grips and comprising a flexible tightener, a hook securing member and a connected attaching device movably engaging the intermediate portion of said tightener, a spiral spring interposed between said hook securing member and attaching device, a hook securing member secured to each end of said tightener and a tightening spring connected to said tightener adjacent one of its ends adapted to exert tightening action thereon when said securing members connect said tightener to separate points in the side member of a tire grip.

3. The tightener device adapted for use in chain tire grips and comprising a flexible tightener, a securing member and a connected attaching device engaging the intermediate portion of said tightener, a spring interposed between said securing member and attaching device, a securing member secured to each end of said tightener and a tightening spring connected to said tightener adjacent one of its ends adapted to exert tightening action thereon when said securing members connect said tightener to separate points in the side member of a tire grip.

4. The tightener device adapted for use in chain tire grips and comprising a flexible tightener, a securing member and a connected attaching device engaging the intermediate portion of said tightener, a securing member secured to each end of said tightener and a tightening spring connected to said tightener adjacent one of its ends adapted to exert tightening action thereon when said securing members connect said tightener to separate points in the side member of a tire grip.

5. The tightener adapted for use in chain tire grips and comprising a tightener chain, a hook securing member and a connected eye movably engaging the intermediate portion of said tightener chain, a spiral spring interposed between said hook securing member and eye and formed integral therewith, a hook securing member and a connected ring secured to each end of said tightener chain and a spiral tightening spring interposed in said tightener chain adjacent one of its ends, said rings being of larger diameter than said eye to prevent the tightener chain being disengaged from said eye.

6. The tightener adapted for use in chain tire grips and comprising an adjustable length flexible tightener, a hook securing member adjustably connected to the intermediate portion of said tightener, a spiral spring interposed between said hook securing member and tightener and a securing member secured to each end of said tightener.

7. The tightener device adapted for use with chain tire grips and comprising a non-rigid tightener having a tightening spring connected thereto and having a securing member adjacent each end of said tightener and a single intermediate securing member connected to said tightener intermediate its ends, so that said securing members can engage and resiliently take up the side chain of a tire grip at three separated points.

HOWARD W. LODER.

Witnesses:
HARRY L. DUNCAN,
JESSIE B. KAY.